(12) United States Patent
Gilles et al.

(10) Patent No.: US 7,507,339 B2
(45) Date of Patent: Mar. 24, 2009

(54) SELF-DRAINING OIL FILTER ADAPTOR

(75) Inventors: Jeremy J. Gilles, Malone, WI (US);
Terrence M. Rotter, Sheboyban Falls, WI (US)

(73) Assignee: Kohler Co., Kohler, WI (US)

( * ) Notice: Subject to any disclaimer, the term of this patent is extended or adjusted under 35 U.S.C. 154(b) by 171 days.

(21) Appl. No.: 11/548,332

(22) Filed: Oct. 11, 2006

(65) Prior Publication Data
US 2007/0144958 A1 Jun. 28, 2007

Related U.S. Application Data

(60) Provisional application No. 60/725,846, filed on Oct. 12, 2005.

(51) Int. Cl.
*B01D 35/16* (2006.01)
*F01M 11/03* (2006.01)

(52) U.S. Cl. .................................. 210/235; 210/248

(58) Field of Classification Search ................ 210/234, 210/235, 248
See application file for complete search history.

(56) References Cited

U.S. PATENT DOCUMENTS

| | | | | |
|---|---|---|---|---|
| 3,066,803 A | * | 12/1962 | Seils, Jr. | ................ 210/167.02 |
| 4,836,923 A | | 6/1989 | Popoff et al. | |
| 5,468,386 A | * | 11/1995 | Ardes | .......................... 210/248 |
| 5,516,425 A | | 5/1996 | Brieden et al. | |
| 5,770,065 A | | 6/1998 | Popoff et al. | |
| 6,016,923 A | * | 1/2000 | Baumann | .................... 210/440 |
| 6,381,983 B1 | | 5/2002 | Angelo et al. | |
| 6,488,845 B1 | | 12/2002 | Neufeld et al. | |
| 6,837,993 B2 | | 1/2005 | Clausen et al. | |
| 2003/0150787 A1 | * | 8/2003 | Morita | ........................ 210/234 |

FOREIGN PATENT DOCUMENTS

| | | | |
|---|---|---|---|
| DE | 3344568 | | 9/1983 |
| DE | 3344568 A1 | * | 6/1985 |
| DE | 102004047047 A1 | | 4/2006 |
| WO | 2004087290 A1 | | 10/2004 |

OTHER PUBLICATIONS

Oil filter modules; MAHLE Driven by performance; http://mahle.com/C125705E004FDAF9/CurrentBaseLink/W26LLCVG257STULEN.

* cited by examiner

*Primary Examiner*—Thomas M Lithgow
(74) *Attorney, Agent, or Firm*—Whyte Hirschboeck Dudek SC

(57) ABSTRACT

A cleaner oil change procedure can be achieved by using an adaptor assembly that comprises: a housing unit that defines a cavity volume; a filter mount connected to the housing unit, and adapted to mount a spin-on oil filter; an inner piston slidably engaged with the filter mount and adapted to fit within the cavity volume, wherein the inner piston is moveable between a first position within the cavity volume and a second position substantially outside of the cavity volume; an actuator spring located between the inner piston and the housing unit, wherein the actuator spring exerts a force on the inner piston capable of moving the inner piston from the first position to the second position; a drain valve slidably connected to the inner piston; a drain channel in the housing unit; and a valve spring adapted to force the drain valve to seal against the drain channel and prevent flow of oil through the drain channel when the inner piston is in the first position, wherein the drain valve does not seal against the drain channel when the piston is in the second position.

20 Claims, 6 Drawing Sheets

SELF-DRAINING OIL FILTER ADAPTOR

CROSS-REFERENCE TO RELATED APPLICATION

This application claims the benefit of U.S. Provisional Application Ser. No. 60/725,846 filed Oct. 12, 2005.

FIELD OF THE INVENTION

The present invention relates to an apparatus for preventing oil spillage from occurring while removing a spin-on oil filter unit from an engine.

BACKGROUND OF THE INVENTION

In most internal combustion engines, lubrication oil must be filtered to remove contaminants from the oil. In general, two standard type oil filters are used in the industry. One type of oil filter is the spin-on oil filter that comprises the filtration medium encased within a metal or plastic housing. The other style oil filter is a cartridge filter where the outer housing is not present. Proper engine maintenance normally requires that the oil filter be periodically removed and either cleaned or replaced to ensure proper oil filtration.

Spin-on oil filters are frequently mounted in an inverted position, that is, with the openings into and out of the filter orientated facing down and the filter housing facing up. While such an inverted orientation provides for good operation of the filter and can simplify the design of oil flow passages to and from the filter, this orientation has issues for removing the filter from the oil filtration circuit for maintenance. Specifically, when an inverted spin-on oil filter is removed, oil trapped within the volume of the filter housing flows through the openings in the filter and spills over the filter mounting area and into the environment. Such spillage is both a nuisance to the user and an environmental hazard.

Shrouds and guide ways to funnel the draining oil away form the mounting area and into an oil receptacle are known but generally are not convenient to use and/or fail to adequately constrain and collect the spilled oil.

BRIEF SUMMARY OF THE INVENTION

The present inventors have recognized that use of a self-draining oil filter adaptor prevents release of oil into the environment, thereby resulting in a cleaner oil filter change.

In one embodiment the invention is an oil filter adaptor system comprising an adaptor housing, an inner piston, a drain valve, an over travel valve spring, an actuator spring, and a filter nipple. In this embodiment, the invention more specifically is an adaptor assembly comprising: a housing unit having a sidewall that defines a cavity volume; a filter nipple mount connected to the housing unit, wherein the filter nipple mount is adapted to mount a spin-on oil filter; an inner piston slidably engaged with the filter nipple mount, the inner piston adapted to fit within the cavity volume, wherein the inner piston is moveable between a first position within the cavity volume and a second position substantially outside of the cavity volume; an actuator spring located between the inner piston and the housing unit, wherein the actuator spring exerts a force on the inner piston capable of moving the inner piston from the first position to the second position; a drain valve slidably connected to the inner piston; a drain channel in the housing unit; and a valve spring adapted to force the drain valve to seal against the drain channel and prevent flow of oil through the drain channel when the inner piston is in the first position, wherein the drain valve does not seal against the drain channel when the piston is in the second position.

DETAILED DESCRIPTION OF THE PREFERRED EMBODIMENT

Figure 1:
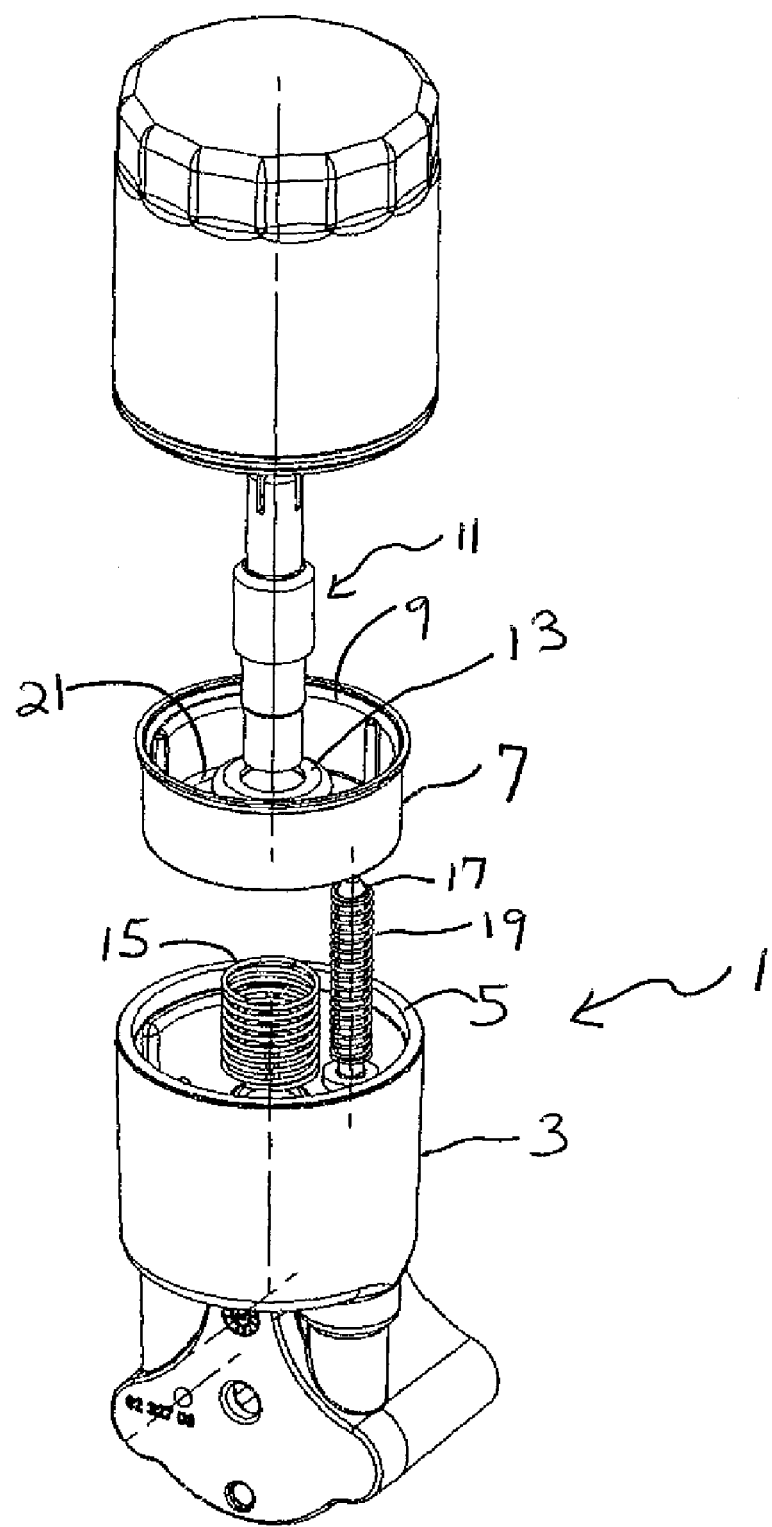
FIG. 1 is an exploded view of an oil filter adaptor assembly of the current invention.

Referring to FIG. 1, the adaptor assembly 1 comprises a housing unit 3 having an inner surface 5. An inner piston 7 fits within the confines of housing inner surface 5. Piston 7 comprises an inner surface 9 a nipple hole 13, and a drain valve hole 21. A filter nipple 11 is adapted to allow mounting of a spin-on oil filter in an inverted position. Nipple 11 is further adapted to extend through nipple hole 13 and an actuator spring 15 such that actuator spring 15 is interposed between the inner piston 7 and the housing unit 3. Drain valve 17 is adapted to extend through drain valve hole 21 and valve spring 19.

Figure 2:
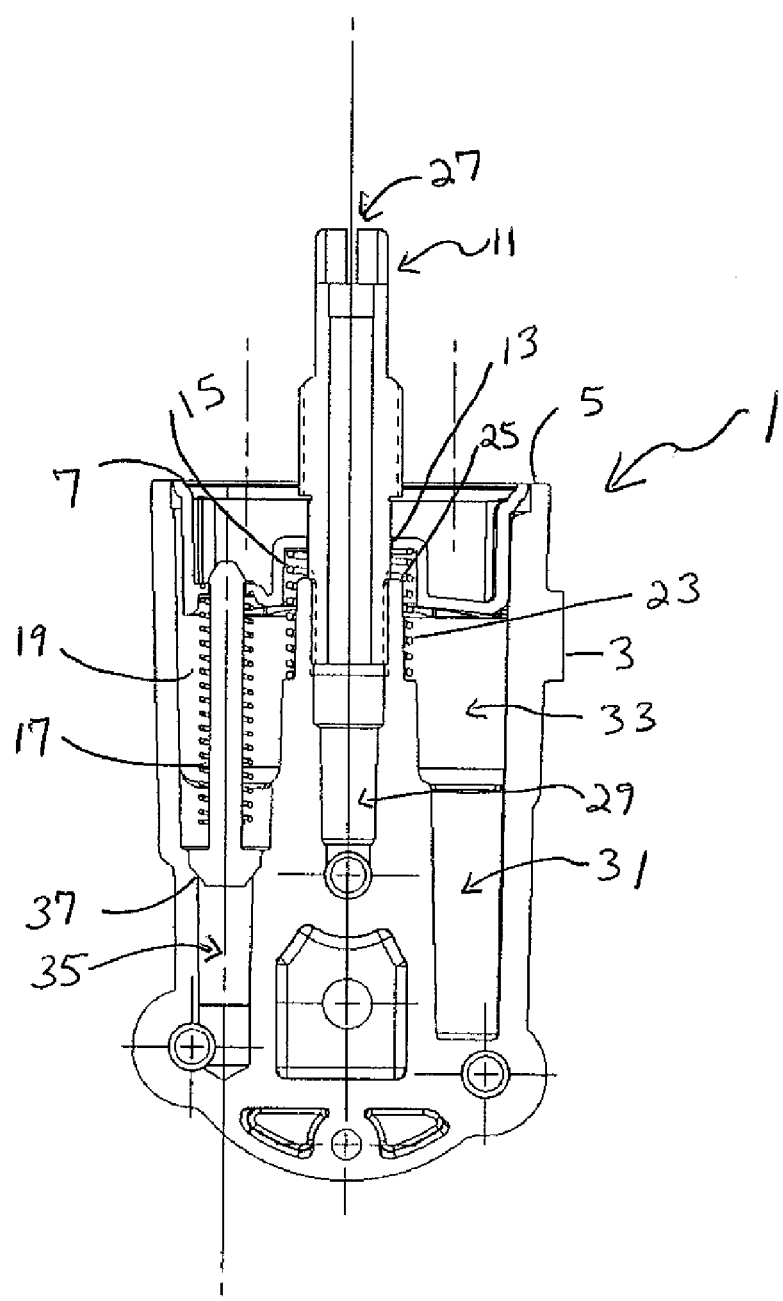
FIG. 2 is a side cross-sectional view of the adaptor of FIG. 1 in an engine operation position with the spin-on filter not shown.

FIG. 2 shows the adaptor assembly 1 in operating position, although the spin-on filter is not shown in this view. The inner piston 7 is positioned fully within the confines of the inner wall 5 of housing unit 3, resulting in actuator spring 15 being in a compressed position. In a preferred embodiment, actuator spring 15 engages ridges 23 on a center mount 25 in order to hold the spring in place during assembly and disassembly. Actuator spring 15 extends around a lower portion of filter nipple 11 and the center mount 25 and is further compressed between the inner piston 7 and the housing unit 3.

An inner bore 27 of filter nipple 11 is in fluid communication with a first oil flow channel 29 of the housing unit 3 to provide a flow path for filtered oil to exit the filter and return to the crankcase.

A second oil flow channel 31 of housing unit 3 provides a flow path for unfiltered oil to enter the lower cavity volume 33 of housing unit 3. Unfiltered oil flows upward from the lower cavity volume 33 through and past the inner piston 7 to enter the oil filter through a number of holes located around the oil filter. Inner piston 7 typically has a number of holes in the body or floor of the piston (not shown) to allow oil to flow past the piston.

A third oil flow channel 35 provides a flow path for oil to drain from the lower cavity volume 33 to the crankcase. As shown in FIG. 2, in operating position, the drain valve 17 is held against a valve seat 37 by the valve spring 19, thereby preventing flow of oil through the third channel 35. Conveniently, drain valve 17 is designed for over travel to ensure that the valve will reach the valve seat 37.

In an alternative embodiment, the third oil flow channel 35 provides a flow path for oil to drain from the lower cavity volume 33 to a reservoir or receptacle, such as a collection bucket.

Figure 3:
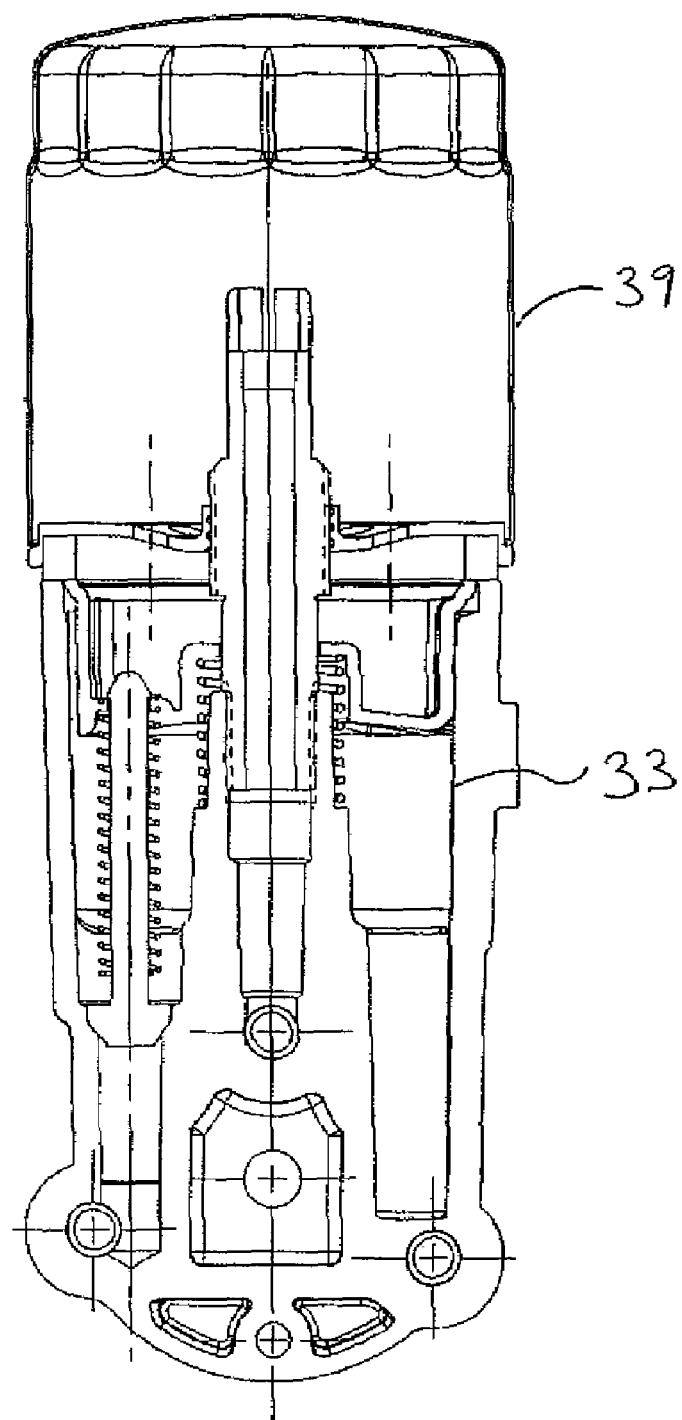
FIG. 3 shows the same view as FIG. 2 with the spin-on filter shown.

Referring to FIG. 3, when the lubrication system is operating, oil is present in the lower cavity volume 33 and in the spin-on filter 39. When the lubrication system is not operating (e.g., the engine is not running), oil will remain trapped in the lower cavity volume 33 and in the filter 39.

Figure 4:
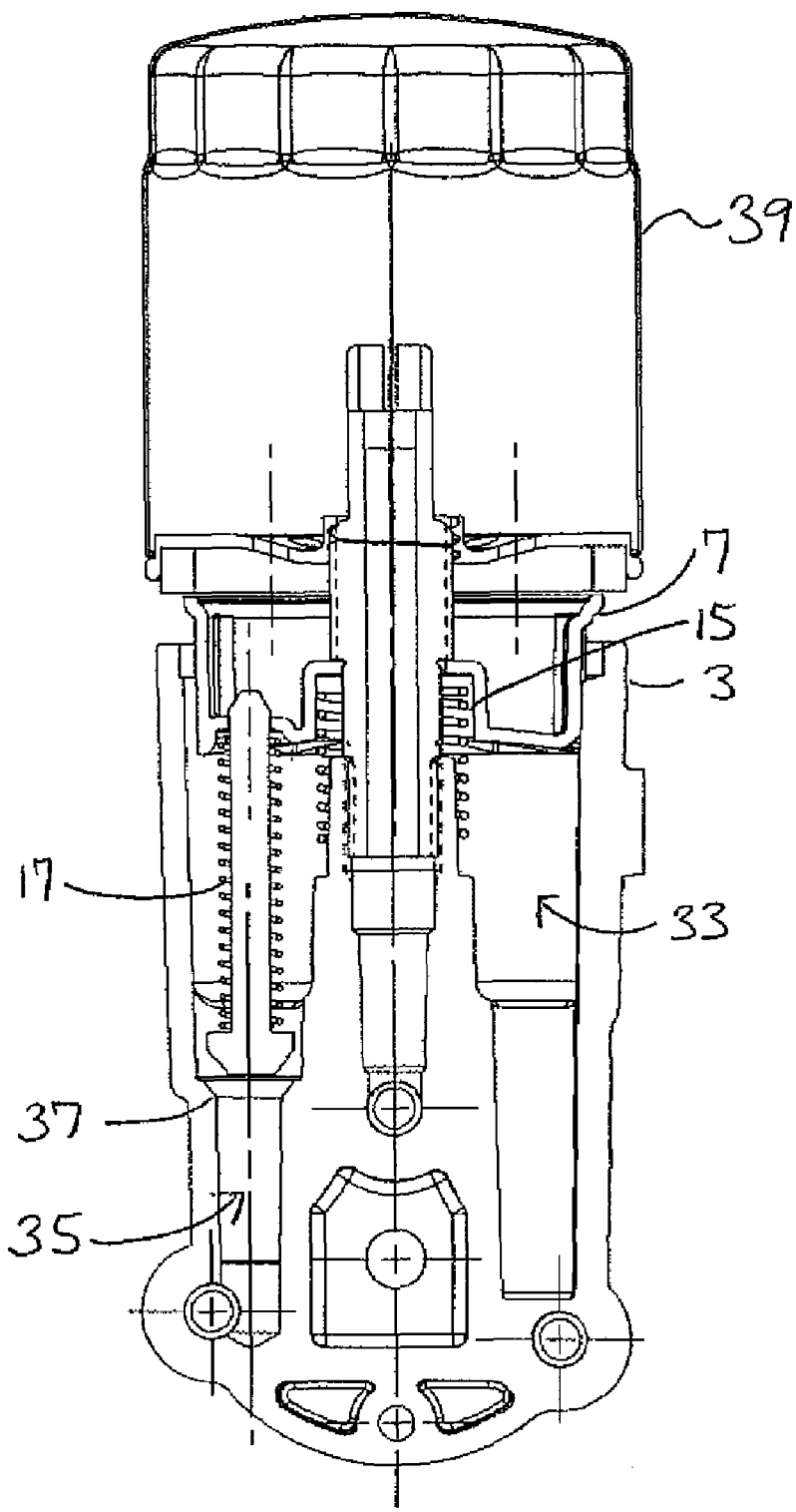
FIG. 4 is a side cross-sectional view of the adaptor of FIG. 3 showing the filter partially removed.

FIG. 4 shows the system at the beginning of the disassembly process with oil filter 39 spun to a partially removed position. Spinning the oil filter 39 away from the housing unit 3 allows actuator spring 15 to drive the inner piston 7 up and away from housing unit 3. The movement of inner piston 7 engages drain valve 17 causing the valve to withdraw from valve seat 37, thereby allowing oil in lower cavity volume 33 to drain to the crankcase via the third oil flow channel 35.

Figure 5:
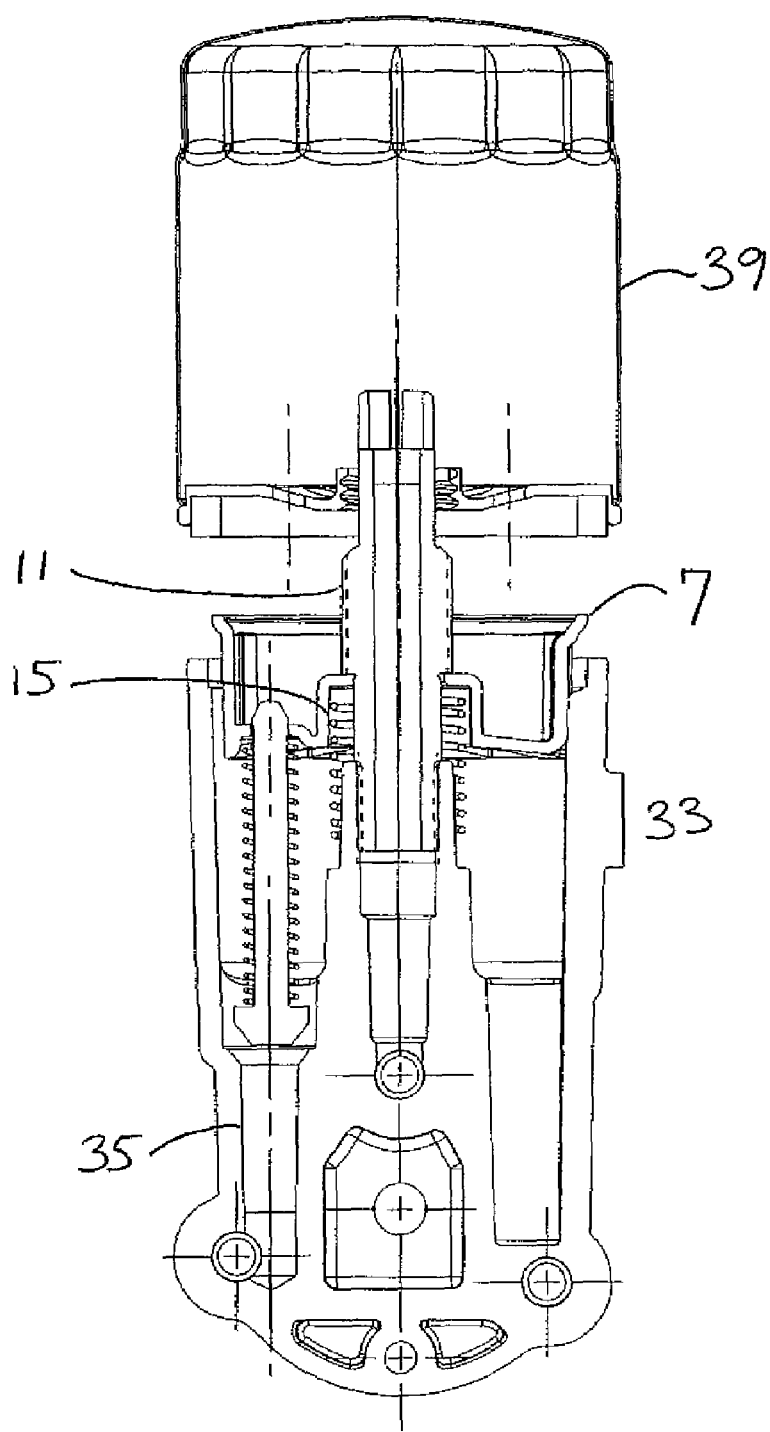
FIG. 5 is a side cross-sectional view of the adaptor of FIG. 3 showing the filter three-quarters removed and draining.
Figure 6:
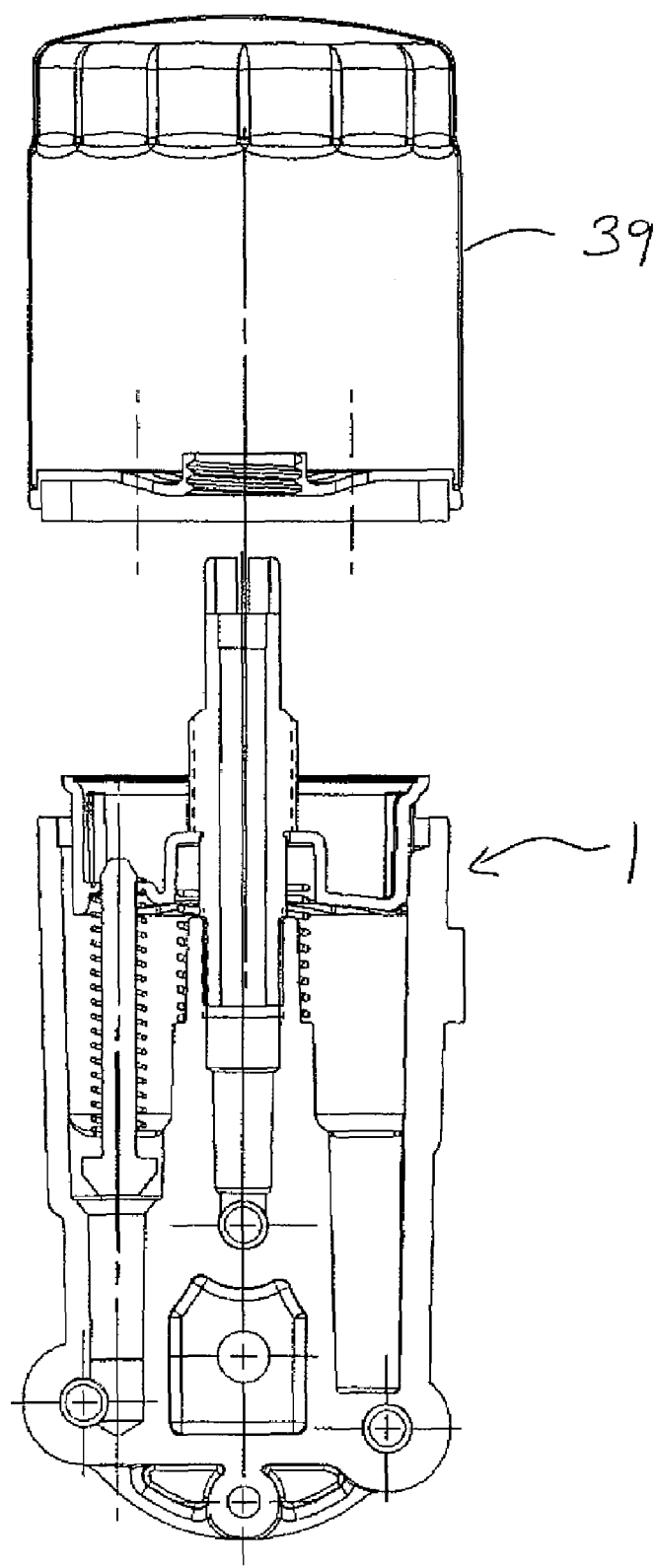
FIG. 6 is a side cross-sectional view of the adaptor of FIG. 3 showing the filter fully drained and removed.

Further along the disassembly process, as shown in FIG. 5, the oil filter 39 is about three-quarters removed. Oil filter 39 is now disengaged with inner piston 7. However, actuator spring 15 has pushed inner piston 7 along filter nipple 11 such that inner piston 7 remains centered below oil filter 39. In this position, oil freely drains from oil filter 39 into and through inner piston 7, and then through lower cavity volume 33 and third oil flow channel 35, eventually reaching the crankcase. Filter 39 may be left in this position until substantially all of the free-flowing oil in the filter has drained into the crankcase. As such, the draining oil is contained and collected into the crankcase with little, if any, spillage of oil to the environment. At this point, the emptied oil filter 39 may be removed from the adaptor assembly 1, as shown in FIG. 6. Oil filter 39 can then be cleaned or a replacement oil filter can be connected.

Assembly and disassembly of the adaptor system is easy and straightforward. As the filter 39 is turned down on filter nipple 11, the filter gasket contacts the inner piston 7. This gasket to piston contact seals the inner filter volume from the environment. As the filter 39 is further tightened onto the filter nipple 11, the filter 39 pushes the inner piston 7 down into the housing unit 3 until the filter gasket contacts the housing unit 3, which thereby forms the final seal of the filter system. The linear movement of inner piston 7 along the filter nipple 11 actuates the valve system and the drain valve 17 closes onto valve seat 37. In one preferred embodiment, the system 1 is designed with an over travel valve which ensures that the system has a consistent and positive closure when the oil filter 39 is installed.

At the planned oil and filter change interval, the user simply turns the filter 39 off of the engine. As the filter 39 moves upward off of the adaptor system 1, the inner piston 7 follows the filter 39 and maintains the seal to the oil filter gasket. This movement opens the drain valve 17 and enlarges the open volume below the filter creating a space for oil trapped in the filter 39 to flow into. As the drain valve 17 opens, the oil is evacuated through the third channel 35 and back into the crankcase. The filter 39 continues to travel up the filter nipple 11 and is further evacuated as the inner piston 7 to filter gasket seal opens. The filter 39 is now adequately drained of oil. The filter nipple 11 preferably has an additional unthreaded section that guides the filter 39 as it is removed from the adaptor system 1. This guidance ensures that the draining oil is properly collected in the housing unit 3. Any remaining oil in the filter 39 is contained in the filter medium and poses a greatly reduced spillage risk. The filter is either cleaned or disposed of properly and a new/cleaned filter is installed. The engine oil can then be properly and refilled thereby completing the oil change interval procedure.

In addition to this system being a separate adaptor, the features shown and depicted herein could also be integrated into the engine casting or plastic components. This filter draining system can also be used in other applications such as, but not limited to, hydraulic fluid filtering, fuel filtering systems, water filtration systems, and other fluid filtration systems requiring regular filter changes.

In another embodiment, the adaptor can be located remotely from the system being filtered. For example, instead of being integrally cast into, or mounted onto, an engine, the adaptor could be mounted in any convenient location, such as a vehicle frame with appropriate conduits providing fluid communication to and from the lubrication system and the adaptor. Depending on the application designed, such a remote location may provide easier access to the filter than if the adaptor were located on the engine.

It is specifically intended that the present invention not be limited to the embodiments and illustrations contained herein, but include modified forms of those embodiments including portions of the embodiments and combinations of elements of different embodiments as come within the scope of the following claims.

We claim:

1. An adaptor assembly comprising:
    a housing unit having a sidewall that defines a cavity volume;
    a filter mount connected to the housing unit, wherein the filter mount is adapted to mount a spin-on oil filter;
    an inner piston slidably engaged with the filter mount, the inner piston adapted to fit within the cavity volume, wherein the inner piston is moveable between a first position within the cavity volume and a second position substantially outside of the cavity volume;
    an actuator located between the inner piston and the housing unit, wherein the actuator exerts a force on the inner piston capable of moving the inner piston from the first position to the second position; and,
    a closable drain operatively connected to the inner piston;
    wherein the drain is open when the inner piston is in the second position and closed when the inner piston is in the first position.

2. The adaptor assembly of claim 1 wherein screwing a spin-on oil filter onto the filter mount moves the inner piston from the second position to the first position.

3. The adaptor assembly of claim 1 wherein screwing a spin-on oil filter off of the filter mount permits the actuator to move the inner piston from the first position to the second position.

4. The adaptor assembly of claim 1, wherein the closable drain comprises:
    a drain valve slidably connected to the inner piston;
    a drain channel in the housing unit; and
    a valve spring adapted to force the drain valve to seal against the drain channel and prevent flow of oil through the drain channel when the inner piston is in the first position,
    wherein the drain valve does not seal against the drain channel when the piston is in the second position.

5. The adaptor assembly of claim 4, wherein the valve spring is an over travel spring.

6. The adaptor assembly of claim 1 wherein the actuator comprises a spring.

7. The adaptor assembly of claim 1 further comprising a spin-on oil filter mounted on the filter mount such that the inner piston is in the first position.

8. The adaptor assembly of claim 1 further comprising:
    a first oil flow passage providing fluid communication between the cavity volume of the housing unit and an engine lubrication system; and,
    a second oil flow passage providing fluid communication between an inner passage within the filter mount and the engine lubrication system.

9. The adaptor assembly of claim 8 further comprising a spin-on oil filter mounted on the filter mount such that the inner piston is in the first position.

10. The adaptor assembly of claim 8 wherein oil moves through a first flow path when the inner piston is in the first position and a second flow path when the inner piston is in the second position.

11. The adaptor assembly of claim 10 wherein the first flow path comprises a flow directed from the engine lubrication system through the first flow path then through the cavity volume of the housing unit then through the spin-on oil filter then through the inner passage of the filter mount then through the second oil flow passage to the engine lubrication system.

12. The adaptor assembly of claim 10 wherein the second flow path comprises a flow directed from the cavity volume of the housing unit through the closable drain to a crankcase.

13. The adaptor assembly of claim 1 wherein the inner piston has at least one opening to permit flow through the inner piston.

14. The adaptor assembly of claim 1 wherein the assembly is attached to an engine.

15. The adaptor assembly of claim 1 wherein the adaptor housing is integrally formed with the engine.

16. An engine comprising the adaptor assembly of claim 1.

17. A method for maintaining an engine lubrication system, the method comprising:

mounting a spin-on oil filter to a filter mount located at least partially in a housing of an adaptor, the adaptor comprising the housing, an inner piston slidably engaged with the filter mount, an actuator biasing the inner piston away from the housing, a closable drain in the housing and operatively connected to the inner piston, wherein the spin-on filter is mounted in contact with the housing and such that the inner piston is moved along the filter mount toward the housing and against the actuator bias, thereby causing the closable drain to be closed;

partially removing the spin-on filter from the adaptor such that the spin-on oil filter is not in contact with the housing and the actuator bias moves the inner piston along the filter mount in a direction away from the housing such thereby causing the closable drain to open;

allowing oil to drain from the partially removed oil filter into the housing; and, allowing the oil in the housing to flow down the open closable drain.

18. The method of claim 17 further comprising removing the oil filter completely from the filter mount after the oil is allowed to drain from the filter.

19. The method of claim 18 further comprising mounting a replacement spin-on oil filter to the filter mount, wherein the replacement spin-on filter is mounted in contact with the housing and such that the inner piston is moved along the filter mount toward the housing and against the actuator bias, thereby causing the closable drain to be closed.

20. The method of claim 17 wherein a spin-on oil filter is mounted to the filter mount such that the spin-on filter is in contact with the housing and the inner piston is moved along the filter mount toward the housing and against the actuator bias, thereby causing the closable drain to be closed, the method further comprising allowing oil to flow through a flow path directed from the engine lubrication system through a first passage to the adaptor housing then through the spin-on oil filter then through an inner passage of the filter mount then through a second passage to the engine lubrication system.

* * * * *